C. Lafferty,
Sharpening Reciprocating Stamps.
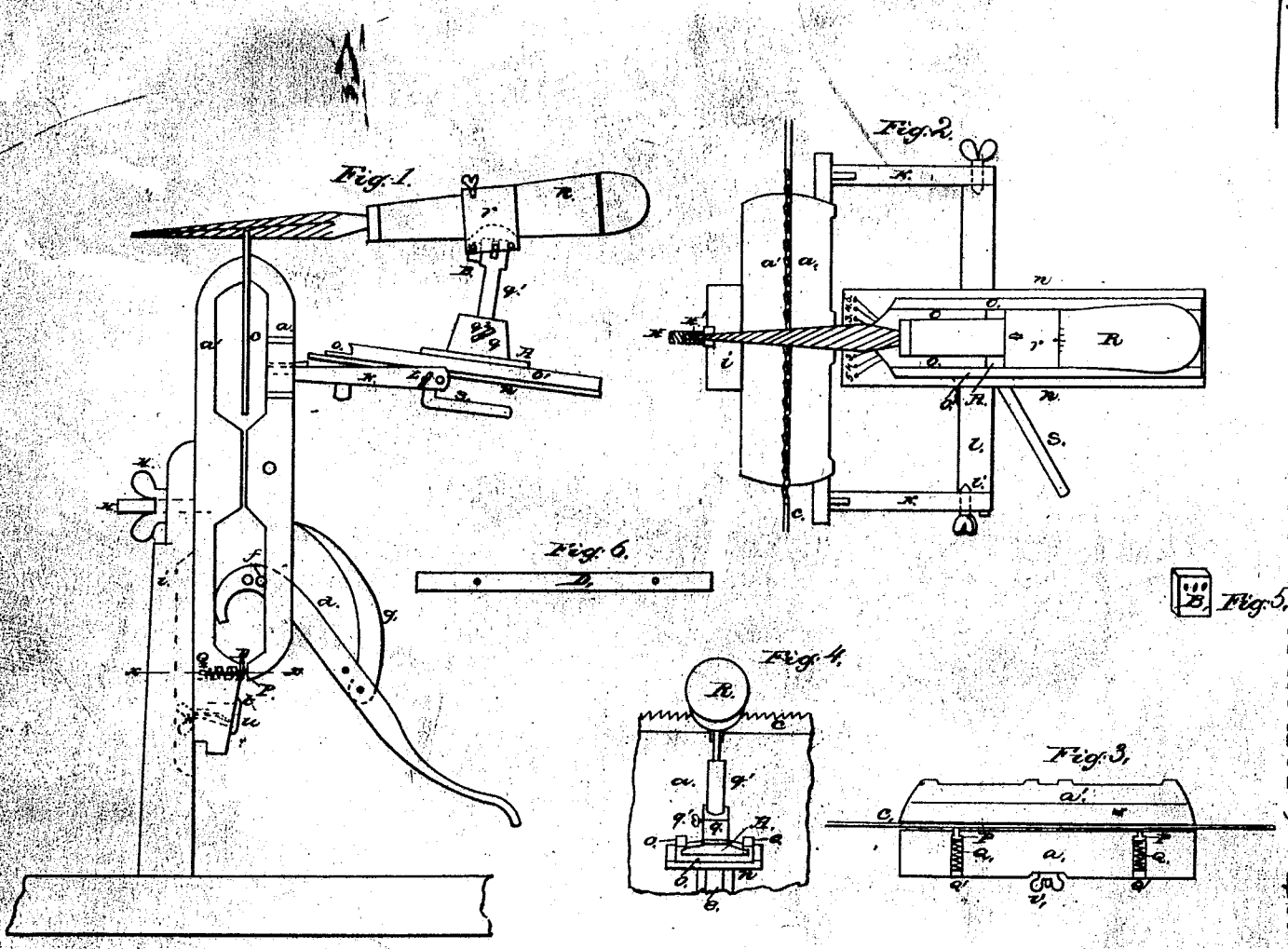
A. I. No 85. A. I. Patented Jan. 25, 1848.